Patented Apr. 15, 1952

2,593,100

UNITED STATES PATENT OFFICE 2,593,100

SILVER CATALYST SUPPORTED ON A MgO-Al₂O₃ SPINEL

George Calingaert, Geneva, N. Y., assignor to Ethyl Corporation, New York, N. Y., a corporation of Delaware No Drawing. Application December 9, 1950, Serial No. 200,127

2 Claims. (Cl. 252—463)

This invention relates to a support for a catalyst useful in the oxidation of olefins. In particular my invention relates to a catalyst support for the oxidation of ethylene to ethylene oxide. My invention is also directed to a process for the oxidation of ethylene using silver deposited on such support.

Ethylene oxide is an important chemical intermediate, being employed commercially in many processes. For example, acrylonitrile can be manufactured by treating ethylene oxide with hydrogen cyanide. Hydrolysis of ethylene oxide to ethylene glycol results in an important antifreeze compound. Likewise, from ethylene glycol can be prepared glycol dinitrate for dynamite. Furthermore, ethanolamines, resins, polymers, aldehydes and glycol ethers can be manufactured from ethylene oxide. By treating the oxide with alkyl phenols important detergents can be manufactured, etc. Finally, ethylene oxide finds commercial use itself as a solvent and fumigant.

It is well known that silver catalyzes the oxidation of ethylene, by means of air or oxygen, to ethylene oxide. Of the many catalysts proposed for this reaction, only silver has been proved in practice to possess sufficient activity and selectivity to merit consideration in a commercial operation. However, for successful commercial operation such catalyst must remain active over long periods of use, must be insensitive to changes of temperature, and must be relatively insensitive to impurities present in the reactants. Silver metal, used alone, fails to satisfy these requirements. In addition, the conversion of ethylene to ethylene oxide must be high and the formation of byproducts, or products of competing reactions must be minimized in order that the manufacturing process be economically attractive. Silver alone produces extremely small yields of ethylene oxide and uneconomically high yields of acetaldehyde, carbon dioxide and water.

Various means have been proposed to overcome these disadvantages, such as incorporating an inert material with the silver, with limited success. Most of these expedients produce a catalyst which suffers from one or more of the disadvantages inherent in the silver alone. In addition, control of the reaction, because of poor heat transfer of the supported catalyst makes the reaction temperature more difficult to control, resulting in an increased proportion of undesirable products, or requiring complicated reactors with internal cooling facilities. To be commercially acceptable it is preferred that a catalyst be supported on a material which can be utilized in a fluidized condition. Many supports which can be utilized in a thermally inefficient fixed-bed reactor cannot be satisfactorily fluidized, and agglomerate, channel, or "slug" when fluidified operation is attempted. Furthermore a catalyst for the oxidation must attain its maximum activity within a reasonable period of operation.

It is, accordingly, an object of this invention to provide a support material for silver such that ethylene oxide can be produced by the direct oxidation of ethylene in its presence and an improved yield obtained thereby. An additional object is to provide a supported silver catalyst which retains maximum activity over long periods, to produce a high yield of ethylene oxide over a broad range of temperatures, and is not destroyed by accidental exposure to abnormally high temperature. It is a further object of this invention to provide a catalyst support for the manufacture of ethylene oxide whereby the activity of the catalyst reaches a maximum after a short period of operation. A still further object is to provide a means for preparing a supported silver catalyst which can be utilized in a process employing fluidized technique to obtain proper control of the exothermic reaction, and minimize the side and secondary reactions. Other objects of our invention will appear from the further description hereinafter.

I obtain the advantages of my invention by incorporating silver with spinel (MgO.Al₂O₃). The conventional amount of silver is deposited on our support, namely 5 to 50 per cent with the best results being obtained between 4 and 20 per cent.

The temperature of reaction for the process of this invention is between 150° and 400° C. although the normal preferred range is between 250° and 300° C. An important advantage of the supports of this invention is that it stands up well at temperatures above 300° C. Frequently, due to poisoning, the silver catalyst loses its activity but the activity can be restored when the temperature is increased above 300° C. Also misoperation may result in a high temperature which must be withstood by the support. The supports of the prior art are deficient in this respect.

It is also important that the catalytic activity of the support reach a maximum after a short period of operation, in order to increase its usefulness. The supports of this invention are excellent in this respect.

The reaction between ethylene and oxygen proceeds at either atmospheric, subatmospheric or superatmospheric pressures. The proportion of ethylene and oxygen or air (or other oxygen-containing gas) while not critical should preferably be between 1:5 and 1:20 parts of ethylene to air.

The silver catalyst on the support used in carrying out the reaction can be disposed in the reaction vessel in any manner provided the necessary contact time is provided, which is preferably between 5 and 30 minutes. However, one advantage of the catalyst support of this invention is that it is readily adaptable to fluidized technique because it can be readily fluidized. Many supports are difficult and even impossible to fluidize.

In order to best fluidize our catalyst and support the catalyst, particle sizes are important. The particles should not be all the same size and it is important that a certain percentage should be small in order to provide a lubricating effect. For best results in a fluid operation the particle size mixture should have 30 to 40 parts between 100- and 200-mesh, 30 to 40 parts between 200- and 325-mesh, and 10 to 35 parts smaller than 325-mesh.

It is customary in this art to use promoters in order to increase the activity of the silver. While good results are obtained in our process without a promoter, for best results one of the following promoters should be used: $BaO_2$, $CaO_2$, $BaCO_3$ benzoyl peroxides and generally the oxides, hydroxides, carbonates, and peroxides of the alkali and alkaline earth metals. However, I prefer to use barium peroxide, $BaO_2$, as the promoter. The amount of promoter used is generally small and is usually between 0.5 per cent and 4 per cent.

The support and catalyst may be prepared and used in any suitable manner such as that generally described in the article by McBee, Hass, and Wiseman, Industrial and Engineering Chemistry, 37, 432 (1945). However, since it is preferred to use the catalyst in a fluidized operation the procedure best suited for such operation now will be described although my invention is not limited to a fluidized catalyst.

The support material to be tested is first mixed in the proper proportion and then sized by screening with standard screens of 100-, 200-, and 325-mesh. The different particle sizes falling within the above mesh sizes are then mixed with silver oxide and distilled water thereby forming a slurry. The slurry is heated while agitating to a temperature of about 120° C. until the catalyst is thoroughly dried. After such drying, each size of catalyst is rescreened and the desired portions of each size are mixed and the catalyst is ready for use in the fluidized reactor.

The invention can be best understood by referring to the following working examples.

Spinel corresponding to $MgO.Al_2O_3$ but containing as impurities 3 to 4 per cent of $SiO_2$, and 0.5 to 1.5 per cent CaO, was crushed, ground and incorporated with the silver as described above. Barium peroxide in the amount of 2.0 per cent was also added. After drying, the silver content was 15.6 per cent and the mixture comprised 35 parts between 100- and 200-mesh, 34 parts between 200- and 325-mesh, and 30 parts less than 325-mesh. To a reactor suitable for fluidized operation, at a temperature of 276° C. 100 parts of catalyst were introduced along with 10 parts of air and 1 part of ethylene. The reaction products were continuously separated from the catalyst. The catalyst reached its maximum activity quickly and after 336 hours of operation 79.2 per cent of ethylene was reacted, the conversion to ethylene oxide being 41.7 per cent.

To demonstrate the thermal stability of the support, the temperature was raised to 310° C. for 24 hours and the yield again determined after the temperature reached 276° C. The conversion to ethylene oxide was still the same. After 805 hours of operation 82.3 per cent of ethylene was reacted, the conversion to ethylene being 42.7 per cent.

Within the limits heretofore set forth, variations in particle size, and temperature results in yields between 35 and 45 per cent. When a promoter such as barium peroxide is not employed, the yields are from 10 to 15 per cent lower. Variations in silver content have very little effect upon yield.

Having described and illustrated my invention, other embodiments within the scope of the following claims are readily apparent to one skilled in the art.

I claim:

1. In an oxidation catalyst containing between 4 per cent and 50 per cent silver, the improvement comprising a support for said silver consisting essentially of a spinel having $MgO.Al_2O_3$ as the principal ingredient.

2. In an oxidation catalyst containing between 4 per cent and 50 per cent silver, the improvement comprising between 0.5 per cent and 4 per cent barium peroxide and a support for said silver, said support consisting essentially of a spinel having $MgO.Al_2O_3$ as the principal ingredient and having a particle size of 30 to 40 parts between 100- and 200-mesh, 30 to 40 parts between 200–325-mesh, and 10 to 35 parts smaller than 325-mesh.

GEORGE CALINGAERT.

REFERENCES CITED

The following references are of record in the file of this patent:

UNITED STATES PATENTS

| Number | Name | Date |
|---|---|---|
| 1,998,878 | Lefort | Apr. 23, 1935 |
| 2,238,474 | McNamee et al. | Apr. 15, 1941 |
| 2,288,566 | Herstein | June 30, 1942 |
| 2,337,421 | Spence | Dec. 21, 1943 |
| 2,424,085 | Bergsteinsson et al. | July 15, 1947 |
| 2,446,132 | Evans | July 27, 1948 |
| 2,491,057 | Navison et al. | Dec. 13, 1949 |